United States Patent
Vargheese et al.

(10) Patent No.: US 9,871,830 B2
(45) Date of Patent: Jan. 16, 2018

(54) INTERNET OF THINGS CONTEXT-ENABLED DEVICE-DRIVEN TRACKING

(71) Applicant: Cisco Technology, Inc., San Jose, CA (US)

(72) Inventors: Rajesh Vargheese, Austin, TX (US); William Nathan Dry, Raleigh, NC (US); Nitesh Trikha, Pleasanton, CA (US); Carlos M. Pignataro, Raleigh, NC (US); Rajah Balu, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 426 days.

(21) Appl. No.: 14/508,020

(22) Filed: Oct. 7, 2014

(65) Prior Publication Data

US 2016/0099976 A1    Apr. 7, 2016

(51) Int. Cl.
*H04L 29/06* (2006.01)

(52) U.S. Cl.
CPC ...... *H04L 65/1069* (2013.01); *H04L 65/1006* (2013.01); *H04L 65/102* (2013.01); *H04L 65/1046* (2013.01)

(58) Field of Classification Search
CPC ............. H04L 65/1069; H04L 65/1006; H04L 65/102; H04L 65/1046
See application file for complete search history.

(56) References Cited

U.S. PATENT DOCUMENTS

| | | | |
|---|---|---|---|
| 7,174,277 B2 * | 2/2007 | Vock | A43B 3/0005 340/545.6 |
| 7,305,467 B2 | 12/2007 | Kaiser et al. | |
| 8,531,288 B1 * | 9/2013 | Khan | G06Q 10/0833 340/10.1 |
| 8,639,666 B2 | 1/2014 | Densham et al. | |
| 9,277,586 B2 * | 3/2016 | Orten | H04W 84/18 |
| 9,600,571 B2 * | 3/2017 | Shaashua | G06F 17/30705 |

(Continued)

FOREIGN PATENT DOCUMENTS

WO    WO 03107293 A1 * 12/2003 ....... G08B 13/19656

OTHER PUBLICATIONS

Perera et al. Context aware computing for the internet of things: A survey. May 5, 2013. IEEE Communications Surveys and Tutorials. https://arxiv.org/pdf/1305.0982.pdf.*

(Continued)

*Primary Examiner* — Uzma Alam
(74) *Attorney, Agent, or Firm* — Edell, Shapiro & Finnan, LLC (57) ABSTRACT

A determination is made at a server that a network connected device is to control monitoring performed by a first network connected sensor. A first connection is established between the network connected device and the first network connected sensor, the first connection providing control of the first network connected sensor by the network connected device. A context change for the network connected device is determined. A second connection between the network connected device and a second network connected sensor is established, the second connection providing control of the second network connected sensor by the network connected device.

20 Claims, 8 Drawing Sheets

(56) References Cited

U.S. PATENT DOCUMENTS

| | | | | |
|---|---|---|---|---|
| 2002/0140814 | A1* | 10/2002 | Cohen-Solal | G01S 3/785 348/172 |
| 2004/0189471 | A1* | 9/2004 | Ciarcia, Jr. | G07C 9/00111 340/572.1 |
| 2005/0088295 | A1* | 4/2005 | Kondo | G08B 13/19641 340/517 |
| 2006/0012480 | A1* | 1/2006 | Klowak | G01S 13/825 340/572.1 |
| 2006/0126738 | A1* | 6/2006 | Boice | G01S 3/7862 375/240.16 |
| 2006/0184376 | A1* | 8/2006 | Graves | G06Q 10/087 705/28 |
| 2007/0080801 | A1* | 4/2007 | Weismiller | A61B 5/411 340/539.13 |
| 2010/0097473 | A1* | 4/2010 | Park | H04N 5/23203 348/159 |
| 2010/0289644 | A1* | 11/2010 | Slavin | G08B 13/2402 340/568.1 |
| 2013/0197859 | A1* | 8/2013 | Albano | G06K 9/00369 702/150 |
| 2014/0098128 | A1* | 4/2014 | Fein | G06F 3/011 345/633 |
| 2014/0098132 | A1* | 4/2014 | Fein | G06T 19/006 345/633 |
| 2014/0195138 | A1* | 7/2014 | Stelzig | G08G 1/0116 701/119 |
| 2014/0333771 | A1* | 11/2014 | Mian | B61L 23/00 348/149 |
| 2015/0016798 | A1* | 1/2015 | Fujimatsu | G06K 9/00362 386/223 |
| 2015/0116501 | A1* | 4/2015 | McCoy | H04N 5/23206 348/169 |
| 2015/0206077 | A1* | 7/2015 | Himmelmann | G06Q 10/063118 340/870.07 |
| 2015/0358777 | A1* | 12/2015 | Gupta | H04L 12/2807 370/254 |

OTHER PUBLICATIONS

Collins, et al., "Algorithms for Cooperative Multisensor Surveillance," Proceedings of the IEEE, vol. 89, No. 10, Oct. 2001, pp. 1456-1477.

Mottaghi, et al., "Coordination of Multiple Agents for Probabilistic Object Tracking," IEEE Canadian Conference on Computer and Robot Vision, May 2005, pp. 162-167.

* cited by examiner

INTERNET OF THINGS CONTEXT-ENABLED DEVICE-DRIVEN TRACKING

TECHNICAL FIELD

The present disclosure relates to remote monitoring devices, and in particular, the control of remote monitoring devices.

BACKGROUND

In the evolution of the Internet, the term Internet of Things ("IoT") has been coined to refer to the uniquely identifiable physical objects and their virtual representations interconnected in a vast network environment. These virtual representations may also be referred to as the Internet of Everything ("IoE") within certain contexts, but there are distinctions between the two concepts. IoE is the networked connection of people, process, data and things. In contrast, IoT involves the networked connections of physical objects and data representations, and does not include the people and process components. Hence, IoE comprises multiple dimensions of technology transitions, and may include IoT.

Device tracking systems, such as video tracking systems, rely on the tracked device to emit a signal within a sensor field. The tracking system searches for the device over some defined area, and then locks onto the identified device's signal. The tracking devices, such as cameras, then move in the direction of the device's signal.

DESCRIPTION OF EXAMPLE EMBODIMENTS

Overview

In accordance with one embodiment, a determination is made at a server that a network connected device is to control monitoring performed by a first network connected sensor. A first connection is established between the network connected device and the first network connected sensor, the first connection providing control of the first network connected sensor by the network connected device. A context change for the network connected device is determined. A second connection between the network connected device and a second network connected sensor is established, the second connection providing control of the second network connected sensor by the network connected device.

Example Embodiments

Figure 1:
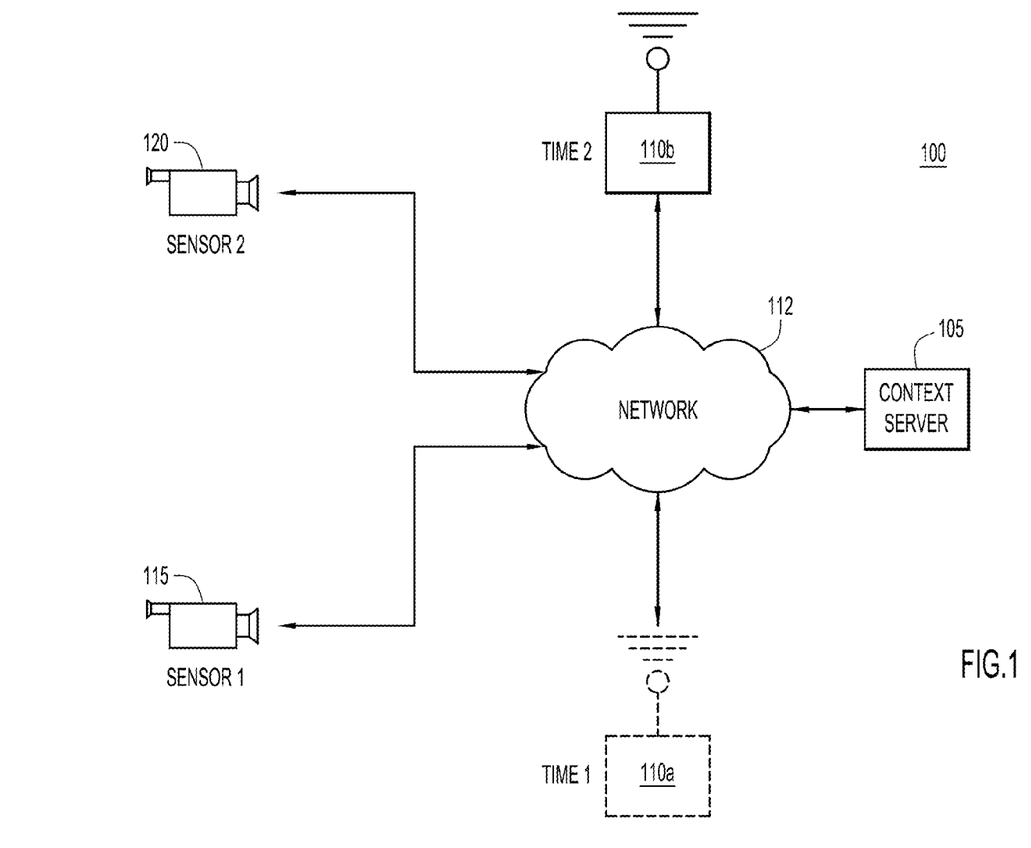
FIG. 1 is block diagram illustrating an environment for providing IoT and/or IoE context-enabled device-driven tracking, according to an example embodiment.

With reference to FIG. 1, depicted therein is a network environment 100 configured to perform IoT and/or IoE context-enabled device-driven tracking. Specifically, a context server 105 is connected through network 112 to a monitored or tracked device 110 at a first time t1. Also connected to context server 105 through network 112 are a first sensor 115 and a second sensor 120. The tracked device 110 is a network connected device which, as suggested by its name, is being tracked or monitored by first sensor 115. First sensor 115 and second sensor 120 are also network connected devices, allowing them to communicate with context server 105, tracked device 110, and each other. Each of tracked device 110, first sensor 115 and second sensor 120 may be embodied as IoT and/or IoE devices. Through the intelligence that may be included in tracked device 110, first sensor 115 and second sensor 120, as well as through their connections to context server 105 through network 112, these devices can be leveraged to provide IoT and/or IoE context-enabled device-driven tracking.

At some later time t2, tracked device 110 is subsequently tracked or monitored by second sensor 120. The change in time from time t1 to time t2 represents a change in context for tracked device 110. As used herein, a change in context refers a change in the status of tracked device 110 which should result in a change in how the tracked device is monitored by sensors 115 and 120. In other words, "context" is, for example, the situation, and aspects of the situation, that are changing with time. For example, in a medical, hospital, or other healthcare environment, as will be described below in more with reference to FIGS. 4 and 5, the change in context may refer to a change in a patient's medical status which changes how the patient should be monitored. According to this example, the change in context may be registered by first sensor 115 when first sensor 115 is embodied as a medical sensor. As will be described below, first sensor 115 may serve as a medical sensor, monitoring a patient's vital signs, such as heart rate, oxygen saturation, blood pressure, or others, while tracked device 110 is a network connected device located on or near the patient. Upon a change in these vital signs, first sensor 115 may communicate the change to context server 105 through network 112. Based on the information sent to context server 105, context server 105 may determine that the patient should be monitored by second sensor 120, which may be embodied in, for example, a video camera.

The second sensor 120 will then be controlled to monitor the patient in response to this change in context. "Control," as used herein, refers to the initiation of sensing by a sensor device. For example, the "control" of second sensor 120 may be an active controlling in the form of directing second sensor to image a particular field of view. In other example embodiments, the control of second sensor 120 may be the sending of an indication to enable second sensor 120, with the intelligence embodied within second sensor 120 determining where and how second sensor 120 is to carry out its monitoring. Of course, variations on these two examples of "control" would similarly fall under the definition of "control" as used herein. Accordingly, another example embodiment may include second sensor 120 locating the patient through a combination of information sent to context server 105 from tracked device 110, and information determined by second sensor 120, such as motion sensing information.

According to other uses of context-enabled device-driven tracking, a change in context may refer to a change in location of tracked device 110, requiring a change in the sensor tracking the tracked device. According to this example, the information indicating the change in location would be communicated to context server 105 from tracked device 110. According to another example, it may be the second sensor 120 which determines that the context has changed, and therefore, the information sent to context server 105 would be sent from second sensor 120.

While first sensor 115 and second sensor 120 are illustrated in FIG. 1 as video cameras, other example embodiments may implement the techniques described herein using other forms of sensors. A non-exhaustive list of possible sensors includes still cameras; audio recording devices; motion sensors; medical sensors including blood pressure sensors, blood oxygen saturation sensors, and heart rate monitors; environmental sensors such as devices configured to sense temperature, humidity, pH, and atmospheric pressure; weight and pressure sensors; electromagnetic radiation detection devices such as photodiodes and charge-coupled devices; devices configured to detect electric and magnetic fields; particle detectors including smoke detectors and Geiger counters; wireless communication devices; speedometers; tachometers; odometers; electrical sensors such as voltage measuring devices, current measuring devices, electrical resistance measuring device, and oscilloscopes; and microfluidic devices, among others.

Figure 2:
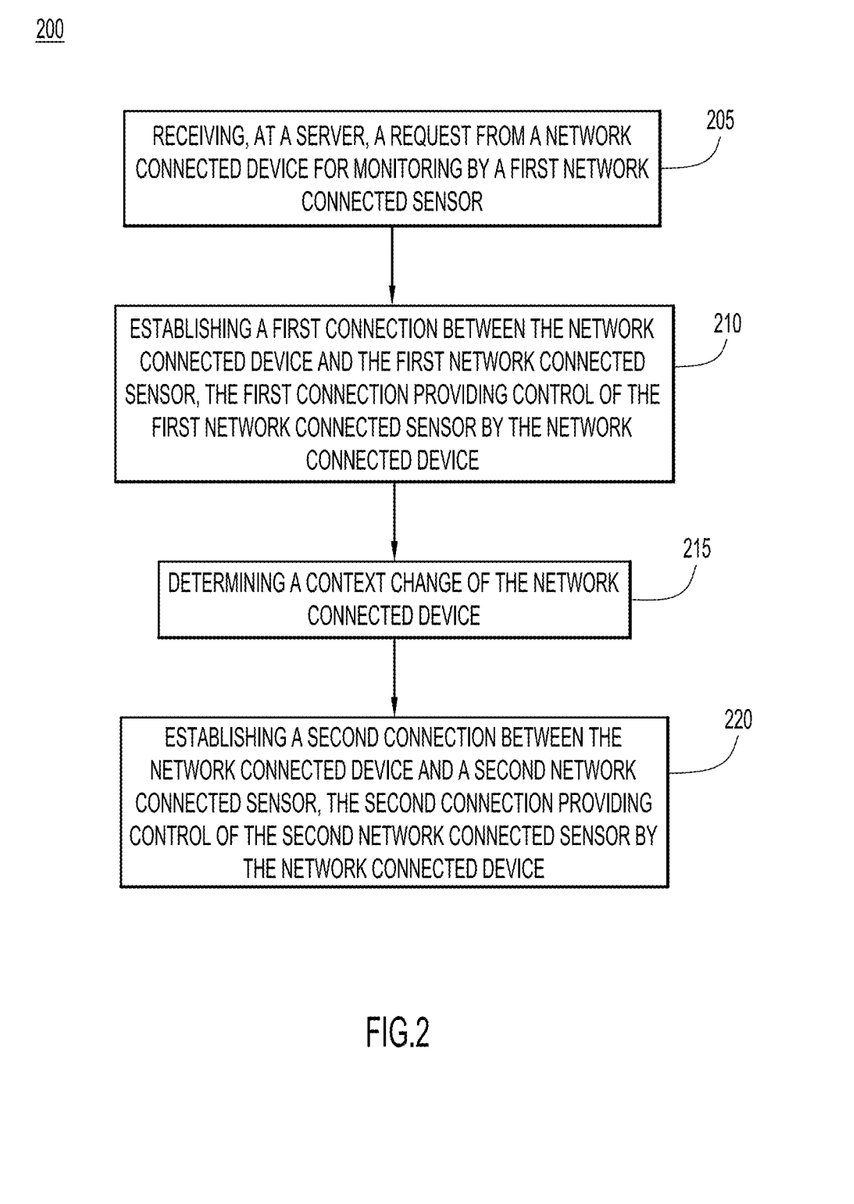
FIG. 2 is a flowchart of a process for providing IoT and/or IoE context-enabled device-driven tracking, according to an example embodiment.

With reference now made to FIG. 2, depicted therein is a flowchart 200 illustrating an example process for performing IoT and/or IoE context-enabled device-driven tracking. According to the example of FIG. 2, the process is described from the "perspective" of a server, such as context server 105 of FIG. 1.

In 205, a determination is made that a network connected device is to control monitoring performed by a first network connected sensor. According to the example embodiment of FIG. 2, the determination is made based upon a request received at a server from the network connected device. In 210, a first connection is established between the network connected device and the first network connected sensor. The first network connection provides control of the first network connected sensor by the network connected device. To use the medical example briefly described above, the request received in 205 may correspond to the initial request to monitor the patient via first sensor 115. The connection used to control and receive data from first sensor 115 would correspond to the first connection of 210.

In 215, a context change is determined for the network connected device. Again using the medical example from above, the change in context could be a change in a monitored patient's status. Specifically, sensor data sent from the first network connected sensor may indicate that a patient's condition has worsened. This data would be sent to the network connected device over the first connection and subsequently sent to the context server and/or sent directly to the context server from the first network connected sensor.

In 220, a second connection is established between a second network connected sensor and the network connected device. This second connection may be established in response to determination of the change in context. The second connection provides control of the second network connected sensor. Returning again to the medical example, the second connection may be a connection to a video camera which allows a doctor to visually monitor the patient's worsened condition.

Figure 3:
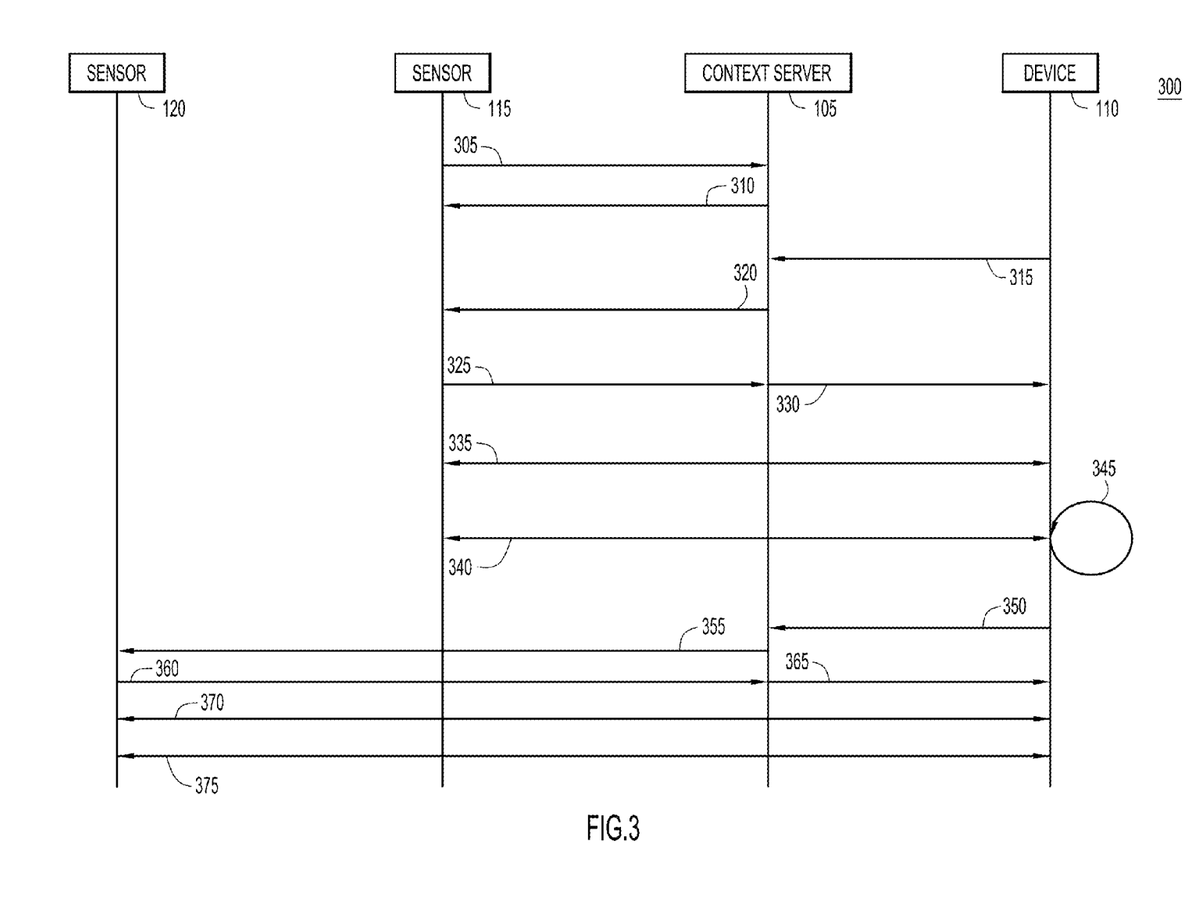
FIG. 3 is ladder diagram illustrating the communications between a context server, one or more network connected sensors, and a network connected tracked device, according to an example embodiment.

With reference now made to FIG. 3, depicted therein is ladder diagram 300, illustrating communications between a context server 105, and other network connected devices which allow for IoT and/or IoE context-enabled device-driven tracking. The communication exchange begins with message 305 sent from a first network connected sensor 115 to context server 105. Specifically, network connected sensor 115 sends message 305 to context server 105 which serves as an indication that first network sensor 115 can be controlled to track a network connected device, such as network connected device 110. Message 305 may also include information such as where first network connected sensor 115 is located, the type of sensor that it is, and other information that will allow context server 105 to determine whether or not to begin sensing with first network connected sensor 115. Using the medical example from above, message 305 may indicate to context server 105 that first network connected sensor 115 is a camera located in a specific examination room.

Context server 105 acknowledges first network connected sensor 115 through message 310. Subsequently, message 315 is sent from network connected device 110 to context server 105 asking to be monitored by first network connected sensor 115. Tracked device 110 may simply request monitoring, and rely on context server 105 to determine the appropriate sensor to perform the monitoring. On the other hand, because tracked device 110 is an intelligent device, message 315 may be a specific request to control first sensor 115. For example, once again returning to the medical example, tracked device 110 may be "aware" of its location, and also aware of the location of first sensor 115. Accordingly, tracked device 110 may specifically request that it be monitored by first sensor 115. On the other hand, message 315 may simply state that tracked device 110 requests to be tracked by a particular sensor type, with the selection of first sensor 115 left up to context server.

Messages 320, 325, 330 and 335 all serve to validate the connection between tracked device 110 and first sensor 115, particularly when tracked device 110 will be providing control of first sensor 115. Specifically, context server 105 communicates to first sensor 115 the intent of tracked device 110 to be monitored, or provide control for, first sensor 115 through message 320. Message 320 may include public credentials for tracked device 110. Message 325 acknowledges receipt of the request, and may also send back the public credentials of first sensor 115. Message 330 provides the public credentials and address (e.g. an IoT or IoE address) of first sensor 115 to tracked device 110. Messages 335 then serve as an exchange between tracked device 110 and first sensor 115 so the devices may connect to and validate each other. Once validated, instructions may be sent to first sensor 115 and data returned to tracked device 110 through exchange 340. First sensor 115 may also send data to context server 105 through messages not illustrated in FIG. 3. The control by and/or monitoring of device 110 is illustrated through looped process 345.

At some time during the process illustrated at 345, the context of the system changes. This context change may be the result of tracked device 110 leaving the area monitored by first sensor 115. According to other examples, the data created by first sensor 115 may indicate a context change. For example, if first sensor 115 is embodied in a medical sensor, such as a blood pressure sensor or a blood oxygen sensor, the data recorded by sensor 115 may indicate a change in the status of a patient associated with tracked device 110. This change in context is communicated to context server 105 through message 350. While message 350 is illustrated as a message sent from tracked device 110, the message may also come from first sensor 115, from another device, such as second sensor 120 or a third sensor not illustrated. Similarly, the change in context may be communicated to context server 105 through the sensor data created by, for example, first sensor 115. According to other examples, tracked device 110 may also serve as a sensor, and message 350 may comprise sensor data from tracked device 110. Furthermore, the change in context may not be an explicit indication of a change in context. Instead, context server 105 may evaluate the sensor data to determine that a change in context has taken place.

In response to the change in context, context server 105 may determine that tracked device 110 should be monitored by second network connected sensor 120. The monitoring to be provided by second sensor 120 may replace or take place in addition to the monitoring provided by first sensor 115 and tracked device 110. In response to determining that second sensor 120 should monitor tracked device 110, message 355 is sent to second sensor 120. Message 355 may include public credentials for tracked device 110, similar to message 320 that was previously sent to first sensor 115. Second sensor 120 acknowledges message 355 through message 360, which may include the public credentials for second sensor 120. The address and public credentials for second sensor 120 may then be sent to tracked device 110 through message 365. Message 365 allows tracked device 110 and second sensor 120 to validate and establish communications with each other through exchange 370. Once second sensor 120 and tracked device 110 are validated and in communication, data and instructions are sent through exchange 375.

Figure 4:
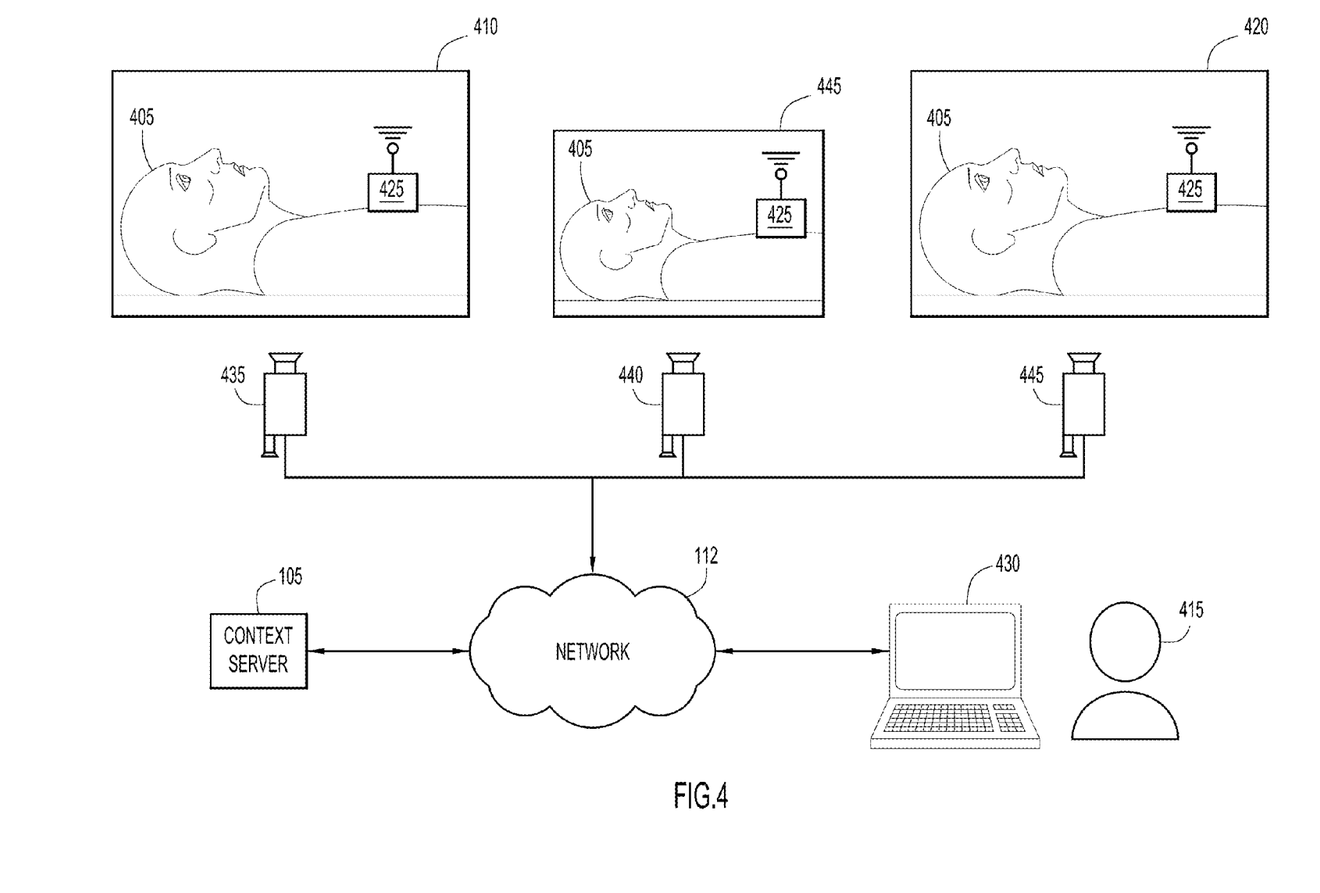
FIG. 4 is a conceptual illustration of an example of IoT and/or IoE context-enabled device-driven tracking in a medical environment, according to an example embodiment.

With reference now made to FIG. 4, depicted therein is an example of IoT and/or IoE context-enabled device-driven tracking implemented in a medical environment. A patient 405 has a wound in his chest and is brought into an observation room 410 on a bed. A remote physician 415 wants to diagnose the wound remotely. The physician 415 requests close monitoring of the blood loss from the wound and recommends a corrective action that will be performed in a different room 420.

A tracked networked connected device 425 is positioned close to the wound. As soon as the remote physician 415 initiates the intent to see the patient through client computer 430, the tracked network connected device 425 communicates with a first network connected sensor 435, which according to the present example is embodied as a camera. The communications trigger a collaboration session among the client device 430, the tracked device 425, and the first network connected sensor 435. Network connected sensor 435 is enabled, and focuses on the wound as directed by tracked network device 425.

Once physician 415 completes his diagnosis and the patient 405 begins to move towards room 420, tracked device 425 and the first network connected sensor 435 communicate, resulting in disabling of the first network connected sensor 435. The tracked device 425 communicates with second network connected sensor 440, and "passes the ball" to the second network enabled sensor 440 when the tracked network device 425 enters hallway 445 where the second network connected sensor 440 is located. In other words, the techniques described herein allow sensors to leverage sensor context (including location) to "asynchronously pass the ball automatically." For example, given the context around various sensors, the focus will be changed and the remote expert, in this case the physician, will be automatically presented with various different views of the patient. This automatic "passing of the ball" creates a new machine-to-machine collaboration paradigm.

Finally, when patient 405 enters room 420, the tracked network device 425 communicates with the second network connected sensor 440, disabling it, and also communicates with third network enabled sensor 445 located in the room 420, to enable third network connected sensor 445. The communications between tracked device 425, first network connected sensor 435, second network connected sensor 440 and third network connected sensor 445 may take place over network 112 and through context server 105, using messages and procedures such as those described above with reference to FIGS. 1 and 2.

The process described above, through the use of network connected tracking devices and network connected sensors, provides improved video tracking over other methods. For example, some device video tracking systems rely on a tracking device which emits a radio or other signal that is detected by the video cameras. The video cameras must search for the device over some defined area, and then lock onto the identified device's signal and move in the direction of the signal. The emitted signal may encounter interference that prohibits the video tracking system from locating and following the device. Furthermore, multiple co-allocated devices may emit the same or very similar signals, resulting in the video tracking system failing to reliably track the desired device. On the other hand, because tracked device 425 and sensors 435, 440 and 445 are network connected devices, they can intercommunicate directly through network 112, overcoming these problems experienced by other methods of providing visual tracking. For example, tracked device 425 can provide an exact location to sensors 435, 440 and 445 through network 112 using messages which will not be interfered with by other messages.

Another difference between the system described above, and other methods of providing device tracking are illustrated in the deficiencies of, for example, object tracking systems used in professional sports broadcast. Sports broadcasting systems use calibrated, fixed position camera arrays and image processing to identify the target object's 3-dimensional (x, y, z coordinates) position in space relative to the field of play. This position is then highlighted/colored on transparent overlay graphics and superimposed on the broadcast video frames. In theses systems, the tracked objects are passive and do not send any positioning instructions to the tracking system; instead, the tracking system searches and locates the object within the observed area. Example embodiments of the systems of the present disclosure differ in that they include an intelligent, network connected tracked device which may determine its own relative position, and instruct the sensor(s) to move and focus on the coordinates supplied by the network connected tracked device. Furthermore, in example embodiments of the present disclosure, calculating the position of an object within a known field of play is no longer required. Accordingly, embodiments of the present disclosure can be more easily deployed and maintenance costs may be reduced. Additionally, example embodiments of the present disclosure overcome further limitations of other methods of device tracking, such as the poor sun light performance experienced by other systems. Furthermore, line-of-sight requirements can be eliminated, and dense sensor arrays and choke points are no longer necessary to receive accurate location information.

Figure 5:
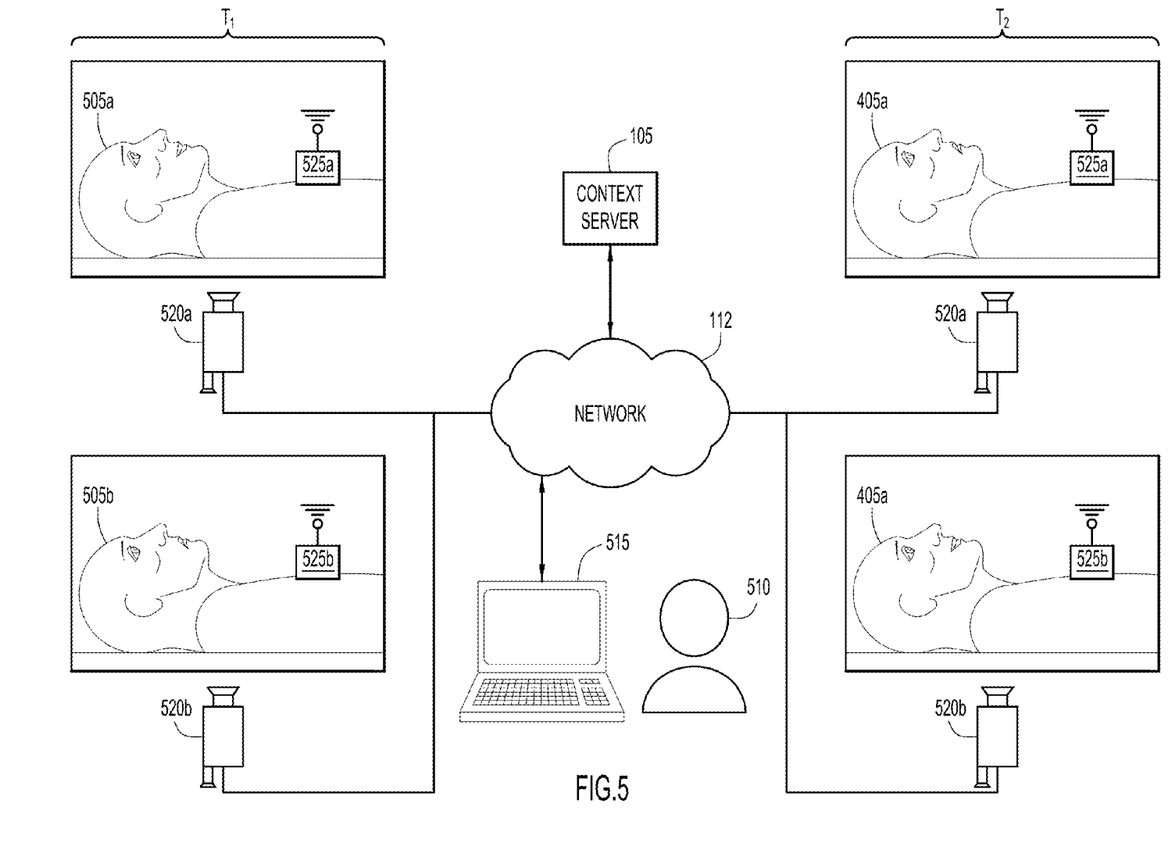
FIG. 5 is a conceptual illustration of a second example of IoT and/or IoE context-enabled device-driven tracking in a medical environment, according to an example embodiment.

With reference now made to FIG. 5, depicted therein is another example embodiment of context-enabled device-driven tracking implemented in a medical environment. Initially, at time t1, a first patient 505a and a second patient 505b are being monitored by a remote physician 510 on a client device 515. Specifically, first patient 505a is being monitored by first network connected camera 520a, as well by first network connected medical sensor 525a. Similarly, second patient 505b is being monitored by second network connected camera 520b and second network connected medical sensor 525b. At time t1, first patient 505a has been determined by first medical sensor 525a to be stable, while second patient 505b has been determined by medical sensor 525b to be less stable. Accordingly, the images provided to physician 510 through client device 515 may focus on patient 505b. For example, camera 520a may be controlled to not provide any images to remote physician 510, while camera 520b is controlled to provide images of second patient 505b to remote physician 510.

At time t2, the status of patient 505a has changed so that now first patient 505a is relatively less stable than second patient 505b, as indicated by first medical sensor 525a and second medical sensor 525b. Accordingly, first medical sensor 525a may send messages to first camera 520a through network 112 and context server 105 to control first camera 520a to begin taking and sending images to remote physician 510 at client device 515.

Similar to the description above in which each patient has its own camera, the techniques described herein can also be used to preempt control of shared cameras, repositioning and focusing the cameras on the patient whose status has changed for the worse, and then sending this video feed of the patient along with a prioritized list of medical sensor data to the available physician. Accordingly, if a single camera were monitoring the area in which first patient 505a and second patient 505b were located, changes in sensor data provided by medical sensors 525a and 525b would determine which patient would be the focus of the data provided by the camera.

When the term "focus" is used in this context, it is not used in the optical sense of the word. Instead, it is referring to the target field of view of the camera and the primacy of the information displayed to a user. Accordingly, when the camera focuses on the worsening patient, the worsening patient becomes the central target of the camera. Of course, repositioning the camera to focus on the patient may also include focusing on the patient in the optical sense of the word as well.

Figure 6:
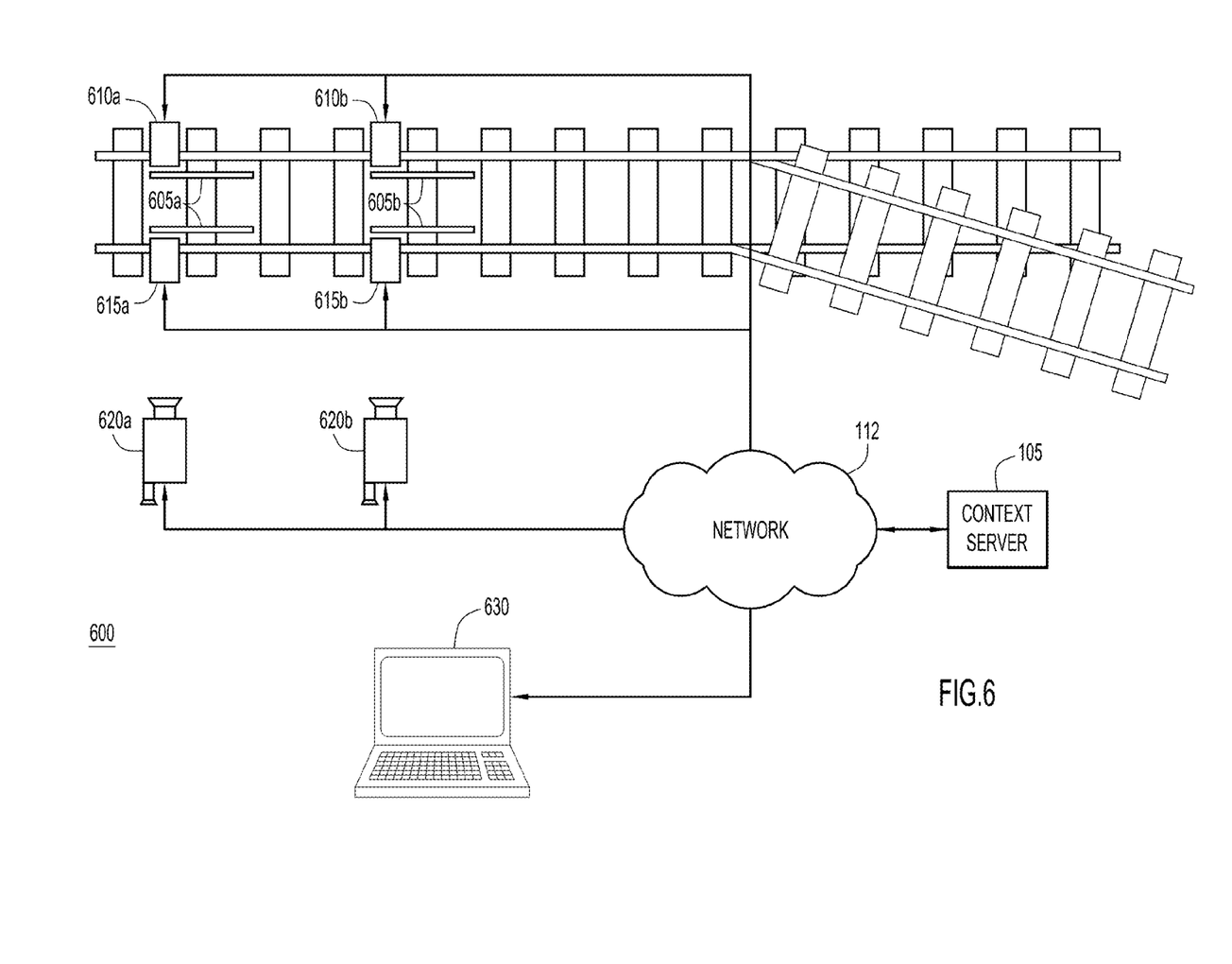
FIG. 6 is a conceptual illustration of an example of IoT and/or IoE context-enabled device-driven tracking in a rail yard environment, according to an example embodiment.

With reference to FIG. 6, depicted therein is another example embodiment of IoT context-enabled device-driven tracking implemented in a railway environment. Switching rail yard 600 sorts and links cars for transport to final destinations. Rail cars must move within a specific speed range in switching yard 600 so they properly join to preceding cars without human intervention. There are hydraulic brakes, such as hydraulic brakes 605a-b, at various points in the rail yard to slow the speed of cars into the desired range. Hydraulic brakes often fail to operate properly and cars are not slowed to their optimal speed range.

To solve this problem, speed sensors 610a-b are introduced along the switching rails and pressure/height sensors 615a-b and network connected cameras 620a-b are located at the hydraulic braking locations in the yard. This system monitors and acts on rail car speed and hydraulic brake operation.

If pressure/height sensor 615a detects a pressure/height gap or failure in hydraulic brake 605a, the system will increase the brake pressures at upstream brake 605b, then alert and display the differential rail car speeds from upstream speed sensor 610b to the yard operators through client device 630. Specifically, sensor 615a will send messages to context server 105 that will directly control upstream brake 605b and speed sensor 610b, or that will serve as an indication to context server 105 that the operation of brake 605b and speed sensor 610b should altered. At the same time, the system focuses the yard monitoring camera 620a on the problem brake 605a for remote analysis and delivers an annotated graph of prior pressure measurements from the faulty brake to the operators/actors monitoring client device 630. The change in focus of the camera 620a could be the result of direct control messages sent from sensor 615a to context server 105, or from data sent to context server 105 indicating that the control of camera 620a should be altered. These annotations will allow operators to determine if brake 605a experienced a gradual failure, or whether the failure was immediate and catastrophic. The communications between the speed sensors 610a-b, hydraulic sensors 615a-b and cameras 620a-b may be sent over network 112 through context server 105.

In other words, when speed sensors 610a-b detect rail cars moving too quickly on a section of track in the switching yard, a set of contextually relevant actions are triggered. These relevant actions may include the generation of brake caliper pressure reports for all upstream brakes, the displaying of the reports to rail technicians, and the repositioning and focusing of rail yard cameras on the brake with the poorest measurements. When the term "focusing" is used here, again it is not used in the optical sense of the word. Instead, it refers to the target field of view of the camera and the primacy of the information displayed to a user. For example, if a brake seizes during the automated diagnostics following the over speed detection, the yard cameras positioned on that brake are brought to the foreground of the display of client device 630, preempting other displayed information.

Figure 7:
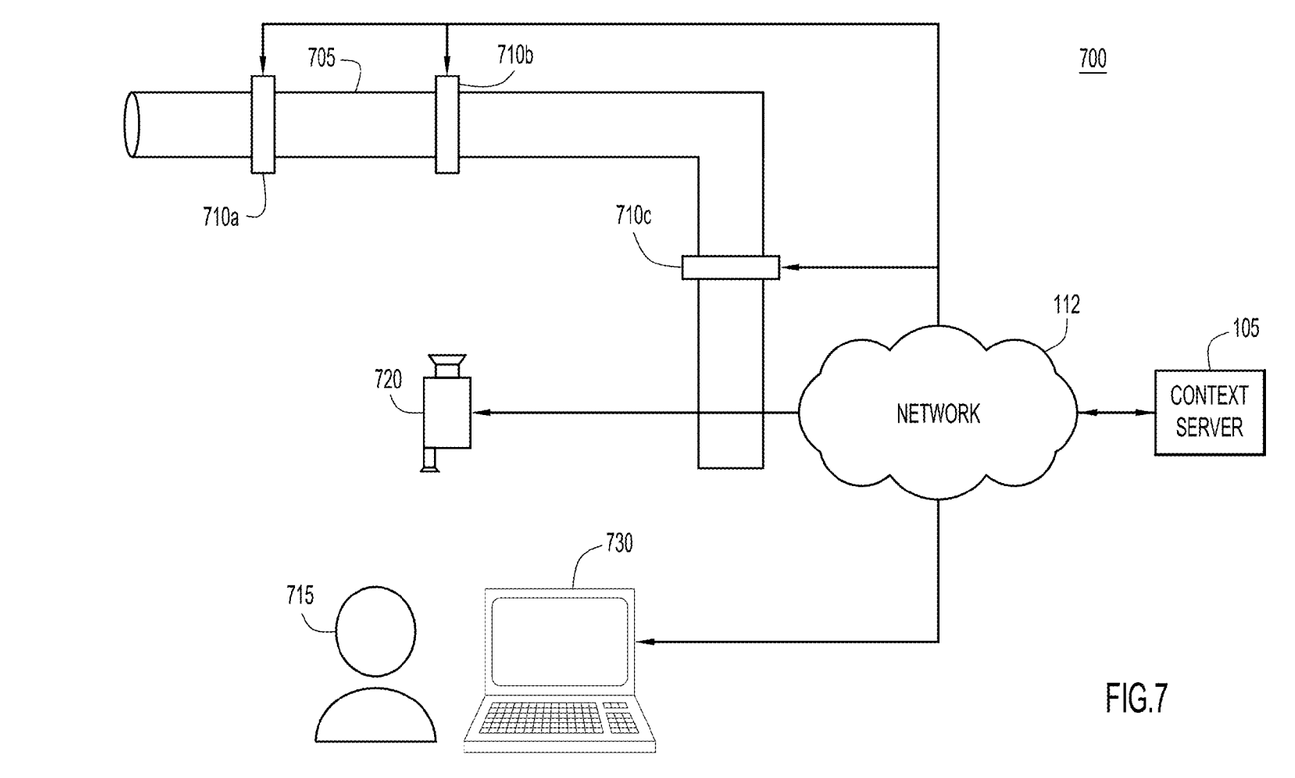
FIG. 7 is a conceptual illustration of an example of IoT and/or IoE context-enabled device-driven tracking in an oil rig environment, according to an example embodiment.

With reference now made to FIG. 7, depicted therein is an example embodiment of IoT context-enabled device-driven tracking implemented in an oil rig environment 700. When a freeze in oil rig pipe 705 is sensed by a network connected sensor 710a, sensor 701a triggers cascading sensors 710b-c to communicate data to technician 715, turn on pipe camera 720, and check vital stats such as pressure and flow at sensors 710b and 710c. Furthermore, sensors 710a-710c allow remote experts 715 to control remote sites along pipe 705, and enable them to collaborate and generate context specific data that can be run through analytics, and that can be used to create modelling information for issue resolution. The communications between the sensors 710a-c, camera 720, and client device 730 of technician 715 may be sent over network 112 through context server 105.

Figure 8:
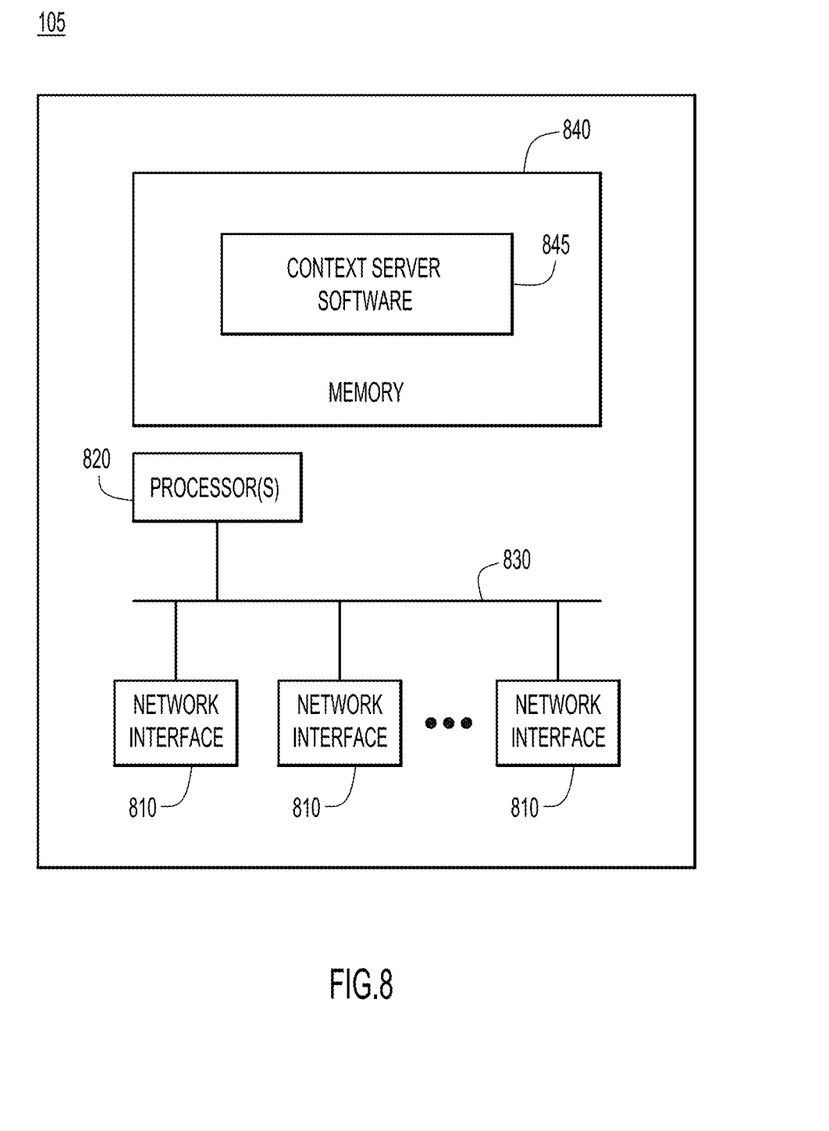
FIG. 8 is a block diagram of a device configured to facilitate IoT and/or IoE context-enabled device-driven tracking, according to an example embodiment.

Referring now to FIG. 8, an example block diagram is shown of a device 105, such as a context server, configured to perform the techniques described herein. Context server 105 comprises network interfaces 810 which may be used to connect to network connected sensors and other network connected devices. A processor 820 is provided to coordinate and control context server 105. The processor 820 is, for example, one or more microprocessors or microcontrollers, and it communicates with the network interface 810 via bus 830. Memory 840 comprises software instructions which may be executed by the processor 820. For example, software instructions for context server 105 include context server software 845. In other words, memory 840 includes instructions that allow context server 105 to carry out the operations described above in connection with FIGS. 1-7.

Memory 840 may comprise read only memory (ROM), random access memory (RAM), magnetic disk storage media devices, optical storage media devices, flash memory devices, electrical, optical or other physical/tangible (e.g. non-transitory) memory storage devices. Thus, in general, the memory 840 may comprise one or more tangible (non-transitory) computer readable storage media (e.g., a memory device) encoded with software comprising computer executable instructions. When the software, e.g., context server software 845, is executed (by the processor 820), the processor is operable to perform the operations described herein in connection with FIGS. 1-7.

Specifically, the context server software 845 allows device 105 to provide a system that enables multiple actors (remote agents) to automatically view a point of interest depending on the context (dependent/contributing sensor feed, location change as the point of interest moves from one location to the other, role of actors, need of actors) using IoT or IoE enabled communication between sensors, such as cameras, view capturing, and other devices. Accordingly, remote experts, such as physicians and railway technicians, can be provided with integrated collaboration without adding any additional overhead or requiring selection by the experts. This automatic context focusing improves efficiently by automating processes that previously would have required effort from the expert. In the healthcare setting, the physician would have previously had to review data from multiple sensors to determine the most important patient to focus on. Now that the focusing takes place automatically, the experts can focus their effort on resolving issues instead of identifying them, reducing the cost of utilizing costly experts.

Additionally, the ability to tie in and bring appropriate parties into the collaboration based on sensor data and location context improves the effectiveness of the remote sensors. Furthermore, because the sensors are controlled based on context, all information captured by the sensors, such as data, image snapshots, conversations, etc., are tied to the context within which they are captured. Accordingly, the video of a patient can be easily associated with the patient's records, and can be used to perform analytics to generate further potential contexts and inferences. Accordingly, the techniques described herein improve compliance, privacy and workflow efficiency.

To summarize, a method is provided comprising: receiving, at a server, a request from a network connected device for monitoring by a first network connected sensor; establishing a first connection between the network connected device and the first network connected sensor, the first connection providing control of the first network connected sensor by the network connected device; determining a context change of the network connected device; and establishing a second connection between the network connected device and a second network connected sensor, the second connection providing control of the second network connected sensor by the network connected device.

Similarly, an apparatus is provided comprising: a network interface unit to enable communication over a network; and a processor coupled to the network interface unit, to: receive, through the network interface unit, a request from a network connected device for monitoring by a first network connected sensor; establish a first connection between the network connected device and the first network connected sensor, the first connection providing control of the first network connected sensor by the network connected device; determine a context change of the network connected device; and establish a second connection between the network connected device and a second network connected sensor, the second connection providing control of the second network connected sensor by the network connected device.

Further still, one or more computer readable storage media are provided encoded with software comprising computer executable instructions and when the software is executed operable to: receive a request from a network connected device for monitoring by a first network connected sensor; establish a first connection between the network connected device and the first network connected sensor, the first connection providing control of the first network connected sensor by the network connected device; determine a context change of the network connected device; and establish a second connection between the network connected device and a second network connected sensor, the second connection providing control of the second network connected sensor by the network connected device.

The above description is intended by way of example only. Various modifications and structural changes may be made therein without departing from the scope of the concepts described herein and within the scope and range of equivalents of the claims.

What is claimed is:

1. A method comprising:
   determining, at a server, that a network connected device, connected to a network, is to control monitoring of the network connected device performed by a first network connected sensor;
   establishing, via the server, a first connection over the network between the network connected device and the first network connected sensor, the first connection providing control of the first network connected sensor by the network connected device via first instruction messages sent from the network connected device to the first network connected sensor via the network;
   receiving a message at the server via the network indicating that the network connected device has undergone a context change, wherein the context change comprises an indication that the network connected device should be monitored by a second network connected sensor, and wherein the message is received from at least one of the first network connected sensor, the second network connected sensor or the network connected device; and
   establishing, via the server, a second connection over the network between the network connected device and the second network connected sensor, the second connection providing control of the second network connected sensor by the network connected device of monitoring of the network connected device by the second network connected sensor via second instruction messages sent from the network connected device to the second network connected sensor via the network.

2. The method of claim 1, wherein receiving the message at the server comprises receiving the message from the network connected device.

3. The method of claim 2, wherein the message is a request from the network connected device to control the second network connected sensor.

4. The method of claim 1, wherein the message includes an indication that the network connected device has moved from a first location to a second location; and
   wherein establishing the second connection comprises establishing the second connection with the second network connected sensor that senses at the second location.

5. The method of claim 1, wherein receiving the message at the server comprises receiving the message from the first network connected sensor.

6. The method of claim 1, wherein:
   determining, at the server, that the network connected device is to control monitoring performed by the first network connected sensor comprises receiving a request from the network connected device to control the first network connected sensor, wherein the request comprises a request from a patient tracking device to control a medical sensor that monitors a patient's medical status;
   receiving the message, at the server, comprises receiving the message from the first network connected sensor indicating a change in the patient's medical status; and
   establishing, via the server, a connection between the network connected device and the second network connected sensor comprises establishing a connection between a camera and the network connected device to provide visual monitoring of the patient.

7. The method of claim 1, wherein:
   receiving the message, at the server, comprises receiving sensor data from the first network connected sensor; and
   establishing, via the server, the second connection between the network connected device and a second network connected sensor comprises triggering a cascade of network connected sensors to monitor the network connected device.

8. The method of claim 1, further comprising providing, via the server, analytics to a user, wherein the analytics comprise at least one of data from the first network connected sensor or data from the second network connected sensor.

9. The method of claim 1, further comprising:
   verifying, at the server, credentials of the network connected device and the first network connected sensor for the first connection; and
   verifying, at the server, credentials of the second network connected sensor for the second connection.

10. The method of claim 1, further comprising:
    the first network connected sensor monitoring an operating condition of the network connected device; and
    the second network connected sensor monitoring at least one of the operating condition or another operating condition of the network connected device.

11. An apparatus comprising:
    a network interface unit to enable communication over a network; and
    a processor coupled to the network interface unit, configured to:
    determine that a network connected device is to control monitoring of the network connected device performed by a first network connected sensor;
    establish a first connection over the network between the network connected device and the first network connected sensor, the first connection providing control of the first network connected sensor by the network connected device via first instruction messages sent from the network connected device to the first network connected sensor via the network;
    receive a message, via the network interface, indicating that the network connected device has undergone a context change, wherein the context change comprises an indication that the network connected device should be monitored by a second network connected sensor, and wherein the message is received from at least one of the first network connected sensor, the second network connected sensor or the network connected device; and
    establish a second connection over the network between the network connected device and the second network connected sensor, the second connection providing control of the second network connected sensor by the network connected device of monitoring of the network connected device by the second network connected sensor via second instruction messages sent from the network connected device to the second network connected sensor via the network.

12. The apparatus of claim 11, wherein the processor is configured to receive the message by receiving a message from the network connected device.

13. The apparatus of claim 11, wherein the message includes an indication that the network connected device has moved from a first location to a second location; and
    wherein the processor establishes the second connection by establishing the second connection with the second network connected sensor that senses at the second location.

14. The apparatus of claim 11, wherein the processor is configured to receive the message by receiving a message from the first network connected sensor.

15. The apparatus of claim 11, wherein the processor:
    determines that the network connected device is to control monitoring performed by the first network connected sensor from a request from a patient tracking device to control a medical sensor that monitors a patient's medical status;
    receives the message by receiving the message from the first network connected sensor indicating a change in the patient's medical status; and
    establishes a connection between the network connected device and the second network connected sensor by establishing a connection between a camera and the patient monitoring device to provide visual monitoring of the patient.

16. One or more non-transitory computer readable storage media encoded with software comprising computer executable instructions and when the software is executed operable to:
    determine, at a server, that a network connected device, connected to a network, is to control monitoring of the network connected device performed by a first network connected sensor;
    establish, via the server, a first connection over the network between the network connected device and the first network connected sensor, the first connection providing control of the first network connected sensor by the network connected device via first instruction messages sent from the network connected device to the first network connected sensor via the network;
    receive a message at the server via the network indicating that the network connected device has undergone a context change, wherein the context change comprises an indication that the network connected device should be monitored by a second network connected sensor, and wherein the messaged is received from at least one of the first network connected sensor, the second network connected sensor or the network connected device; and establish, via the server, a second connection over the network between the network connected device and the second network connected sensor, the second connection providing control of the second network connected sensor by the network connected device of monitoring of the network connected device by the second network connected sensor via second instruction messages sent from the network connected device to the second network connected sensor via the network.

17. The non-transitory computer readable storage media of claim 16, wherein the instructions operable to receive the message at the server comprise instructions operable to receive the message from the network connected device.

18. The non-transitory computer readable storage media of claim 15, wherein the message includes an indication that the network connected device has moved from a first location to a second location; and wherein the instructions operable to establish the second connection comprise instructions operable to establish the second connection with the second network connected sensor that senses at the second location.

19. The non-transitory computer readable storage media of claim 16, wherein the instructions operable to receive the message at the server comprise instructions operable to receive the message from the first network connected sensor.

20. The non-transitory computer readable storage media of claim 16, wherein the instructions operable to:

determine that the network connected device is to control monitoring performed by the first network connected sensor from a request from a patient tracking device to control a medical sensor that monitors a patient's medical status;

receive the message from the first network connected sensor indicating a change in the patient's medical status; and establish a connection between the network connected device and the second network connected sensor by establishing a connection between a camera and the patient monitoring device to provide visual monitoring of the patient.

* * * * *